UNITED STATES PATENT OFFICE.

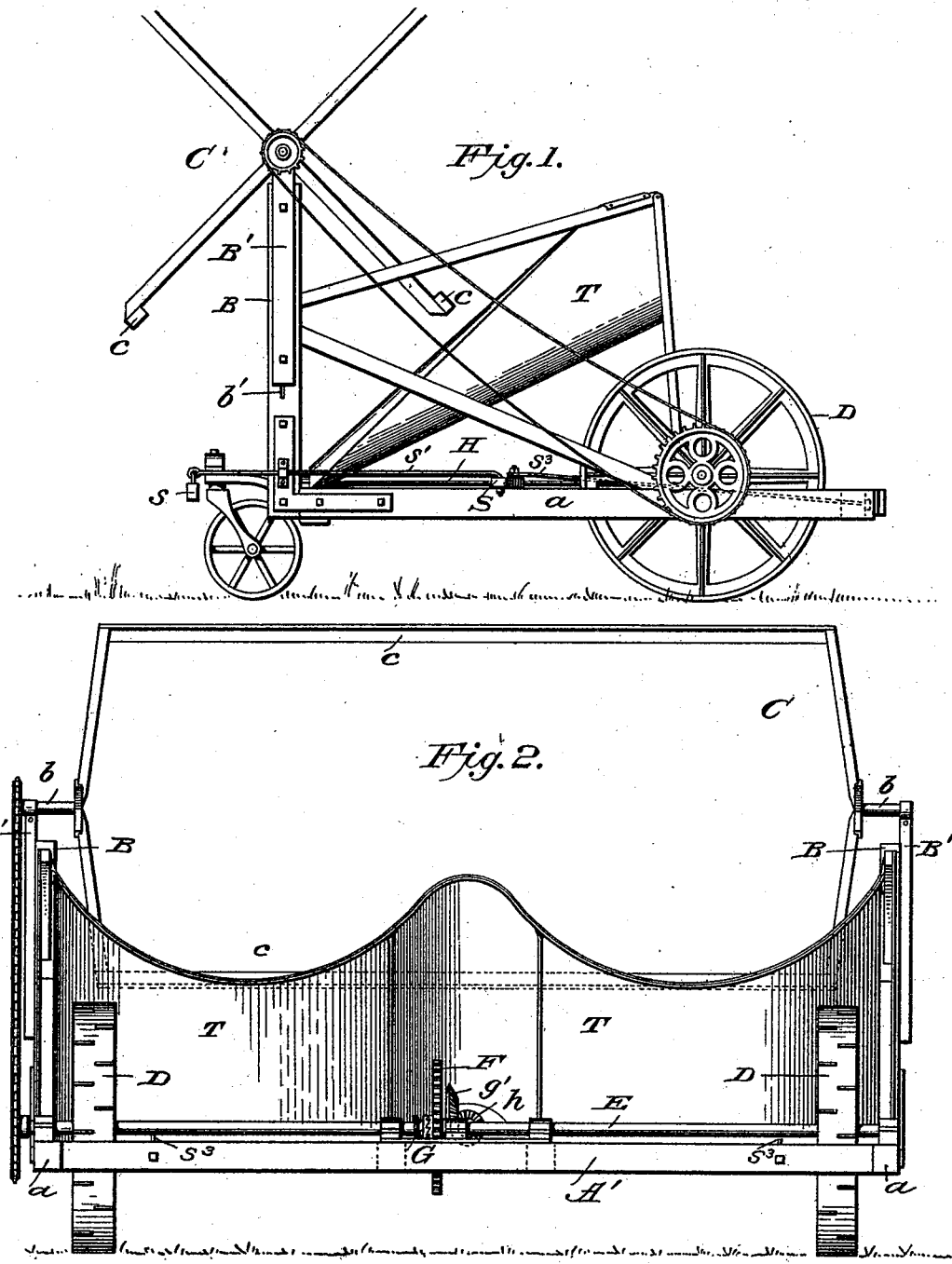

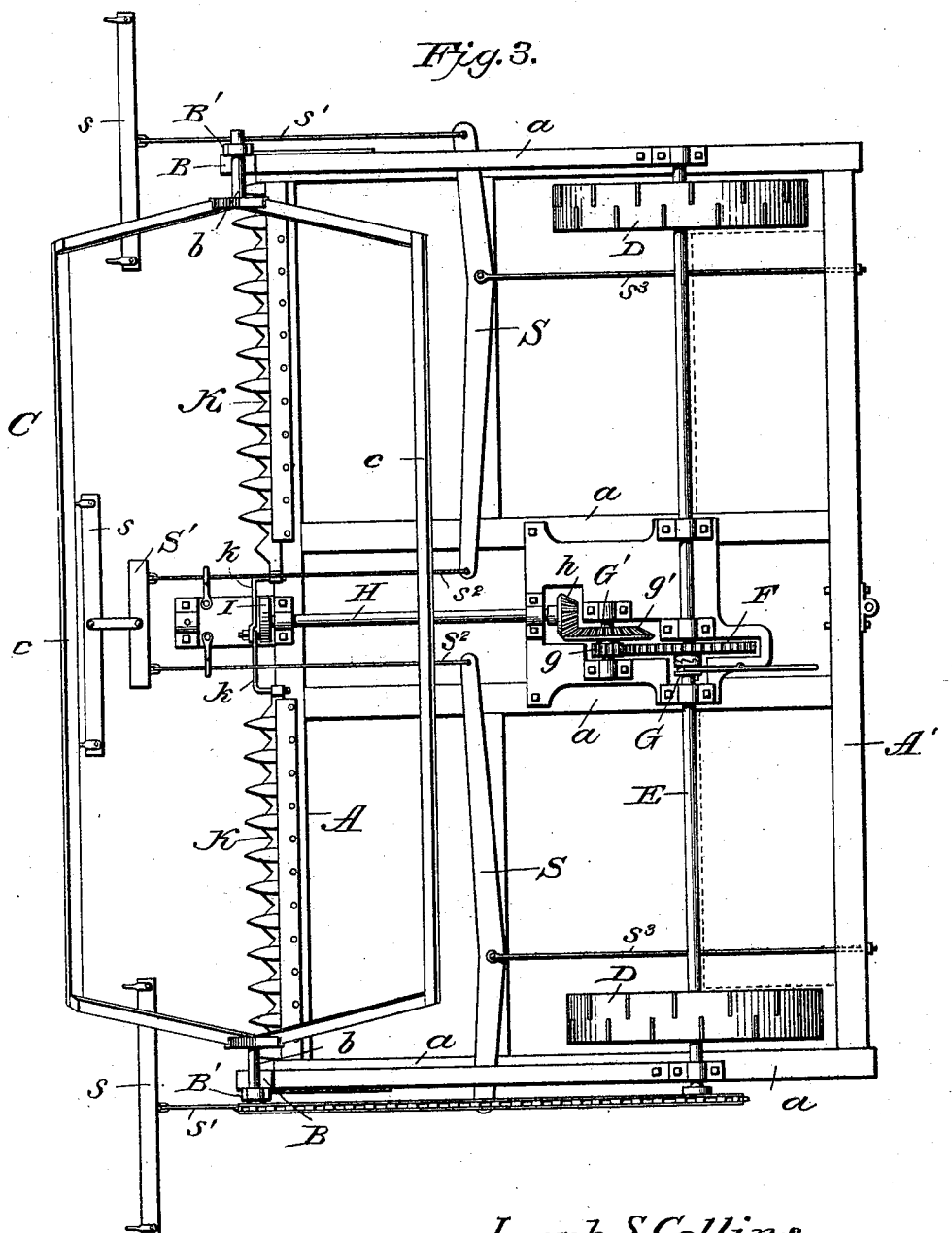

JOSEPH S. COLLINS, OF COLON, NEBRASKA.

CORN-HARVESTING MACHINE.

SPECIFICATION forming part of Letters Patent No. 516,918, dated March 20, 1894.

Application filed August 17, 1893. Serial No. 483,351. (No model.)

*To all whom it may concern:*

Be it known that I, JOSEPH S. COLLINS, a citizen of the United States of America, residing at Colon, in the county of Saunders and State of Nebraska, have invented certain new and useful Improvements in Corn-Harvesting Machines; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to provide a machine for cutting corn stalks and depositing them in sheet-metal troughs or holders made of a single piece so that the connecting portion will overlie the operating mechanism; and it consists in the construction and combination of the parts, as will be hereinafter fully set forth and particularly pointed out in the claim.

In the accompanying drawings, forming part of this specification, Figure 1 is a side view. Fig. 2 is a rear elevation, and Fig. 3 is a plan view.

A and A' designate the front and rear beams of the harvester frame which are connected to each other by longitudinal beams $a\ a$ and intermediate transverse beams as shown.

At the forward ends of the side beams $a\ a$ are rigidly secured uprights B to which are bolted posts B' at the upper ends of which are attached bearings for the stub-shafts $b$ of the reel C, said reel being made up of arms keyed on the inner ends of the stub-shafts and connected to each other by cross-pieces $c$ as shown. The reel is revolved by a sprocket-chain which extends from a sprocket wheel on the main axle to a sprocket-wheel on the projecting end of one of the stub-shafts. By providing the uprights B with the slots $b'$ through which the bolts for connecting the posts B' thereto pass said posts can be adjusted upon the uprights to adjust the reel to and from the cutting mechanism.

E designates the main driving-shaft or axle which is supported and driven by the ground-wheels D and upon which the frame of the harvester is mounted.

Upon the shaft or axle between the central longitudinal beams $a\ a$ is loosely mounted a gearwheel F the hub of which is provided with a clutch-face with which the clutch G is thrown in and out of engagement, said clutch being movable upon the shaft and keyed thereto by means of a spline or feather so that when it is thrown in engagement with the gearwheel said gearwheel will be caused to revolve with the axle. The clutch is operated by a lever in the usual manner. The gearwheel F meshes with a pinion $g$ keyed upon a short shaft G' which is mounted in bearings upon the main frame, said shaft also carrying a beveled gearwheel $g'$ in mesh with a pinion $h$ attached to the rear end of the shaft H which operates the reciprocating cutter-bars located at the forward end of the machine on each side of said shaft.

At the forward end of the shaft H is a crank-wheel I with the wrist-pin of which engages the pitman-rods $k$ connected to the reciprocating cutter-bars K. By positioning the cutter-bars on each side of the center of the machine and leaving a space between them two rows of corn stalks are cut at the same time and the space between the cutter bars corresponds with the space between the rows.

In operation the harvester is drawn by three horses which walk between the rows, and three single-trees $s$ are provided, the end singletrees being connected by rods $s'$ to the short ends of levers S which are pivoted on the main frame while the central single-tree is connected to the long ends of said levers by means of the connecting-rods $s^2$ and equalizer bar S'. The levers S are further connected to the main frame by means of the brace-rods $s^3$ which extend to the rear beam A'.

T designates an inclined trough or holder which is made of sheet metal and extends from a point immediately in the rear of the cutter-bars rearward and upward, and in the rear of the cutter-bars this trough or holder is concave, while it is convex in the rear of the space between the cutter-bars, so as to provide two troughs which will lead the corn-stalks to a shocker which may be connected to the rear end of the harvester. This trough or holder is suitably braced, and not only guides the corn-stalks to the shocker but also covers and protects the driving mechanism.

The rear part of the frame of the harvester is boarded over to provide suitable platforms upon which the attendants may stand.

Having thus described my invention, what I claim as new, and desire to secure by Letters Patent, is—

In a corn harvester, the combination, of a wheel-frame having reciprocating cutter-bars located at the front end thereof on each side of the center, a reel and mechanism for operating the cutter-bars from the supporting-wheels, together with a sheet metal guide or holder T extending from a point immediately in rear of the cutter-bars rearward and upward, the guide or holder having a connecting portion which overlies the center of the machine where the mechanism for operating the cutter-bars is located, substantially as shown and described.

In testimony whereof I affix my signature in presence of two witnesses.

JOSEPH S. COLLINS.

Witnesses:
E. E. LYLE,
H. GILKESON.